United States Patent
Lares (10) Patent No.: US 12,498,355 B2
(45) Date of Patent: Dec. 16, 2025

(54) COILED WIRE INSPECTION SYSTEM AND METHOD

(71) Applicant: COLD HEADING CO., Warren, MI (US)

(72) Inventor: Alan Lares, Pleasant Ridge, MI (US)

(73) Assignee: COLD HEADING CO., Warren, MI (US)

(*) Notice: Subject to any disclaimer, the term of this patent is extended or adjusted under 35 U.S.C. 154(b) by 358 days.

(21) Appl. No.: 17/378,929

(22) Filed: Jul. 19, 2021

(65) Prior Publication Data

US 2022/0018814 A1  Jan. 20, 2022

Related U.S. Application Data (60) Provisional application No. 63/054,030, filed on Jul. 20, 2020.

(51) Int. Cl.
*G01N 29/22* (2006.01)
*G01N 29/04* (2006.01)
*G01N 29/44* (2006.01)

(52) U.S. Cl.
CPC ......... *G01N 29/225* (2013.01); *G01N 29/043* (2013.01); *G01N 29/4445* (2013.01); *G01N 2291/2626* (2013.01)

(58) Field of Classification Search
CPC ............... G01N 29/225; G01N 29/043; G01N 29/4445; G01N 2291/2626;
(Continued)

(56) References Cited

U.S. PATENT DOCUMENTS 3,893,316 A * 7/1975 Simich ................. B21D 3/02
                                                    140/140
4,403,407 A    9/1983 Mazzola
(Continued)

FOREIGN PATENT DOCUMENTS

JP       S59039415 A    3/1984
JP       S60205355 A    10/1985
(Continued)

OTHER PUBLICATIONS

Ishida et al. JP2002028714, English translation (Year: 2002).*
(Continued)

*Primary Examiner* — Xin Y Zhong
(74) *Attorney, Agent, or Firm* — Dickinson Wright PLLC (57) ABSTRACT

A system and method of ultrasonically inspecting coiled wire includes a wire drawer, a first power feeder, an ultrasonic inspection device, and a re-coiler. The wire drawer receives wire that is unspooled from a first coil of wire that has not been internally inspected for defects. The wire is then fed through the first power feeder, which straightens the wire. The straightened wire is then fed through the ultrasonic inspection device to detect internal defects of the wire. The inspected wire is then re-coiled into a second coil of wire that has been ultrasonically inspected for internal defects. Accordingly, raw and uninspected wire coils can be continuously conditioned and inspected and then re-coiled, and may be certified for use in specific manufacturing processes, without having to inspect individual cut and separated sections of wire.

20 Claims, 10 Drawing Sheets

(58) Field of Classification Search
CPC ... G01N 2291/0234; G01N 2291/0422; G01N 2291/055; G01N 2291/057; G01N 29/28; G01N 29/275; G01N 29/048; G01N 29/30

See application file for complete search history.

(56) References Cited

U.S. PATENT DOCUMENTS

| | | | | |
|---|---|---|---|---|
| 5,097,688 | A | * | 3/1992 | Taylor ................ B21C 1/02 72/289 |
| 6,000,656 | A | * | 12/1999 | Taylor ................ B21C 1/02 72/289 |
| 9,895,739 | B2 | | 2/2018 | Zao |
| 2013/0008555 | A1 | * | 1/2013 | Knewtson ............ B21F 1/023 140/147 |

FOREIGN PATENT DOCUMENTS

| | | | |
|---|---|---|---|
| JP | S62278444 | A | 12/1987 |
| JP | S63191057 | A | 8/1988 |
| JP | H0211209 | A | 1/1990 |
| JP | H10198489 | A | 7/1998 |
| JP | 2002028714 | A * | 1/2002 |
| JP | 2011025308 | A | 2/2011 |

OTHER PUBLICATIONS

Olympus: "Bar Inspection Phased Array Technology" Nov. 22, 2017 (Jan. 22, 2017), pp. 1-5, XP055847987, Internet, URL: https://www.incekara-endustri.com.tr/uploads/docs/1576307631_olympusbarInspection.pdf?1576307636, Oct. 5, 2021.

Von Heijnea: "Non-destructive testing of steel and non-ferrous metals" Asea Journal, vol. 47 No. 3, Jan. 1, 1974 (Jan. 1, 1974), pp. 59-65 XP001330604.

* cited by examiner

COILED WIRE INSPECTION SYSTEM AND METHOD

FIELD OF THE DISCLOSURE

The present disclosure is related to material inspection. More particularly, the present disclosure is related to inspection of metal rods and wire to detect imperfections for certifying the material for specified uses.

BACKGROUND OF THE DISCLOSURE

Material standards are in common use throughout the manufacturing industry, in particular in the automotive and mobility industry with respect to fasteners. Automotive manufacturers and suppliers may require a particular level of certification to ensure that supplied fasteners will meet strength requirements.

In the manufacture of steel and other metals, imperfections can occur both on the surface of the material as well as internally, such that there may be internal defects that are difficult to detect via traditional inspection. Different steel manufacturers use different processes to inspect the steel that is produced by the manufacturers. For example, in Japanese steel mills, steel may be produced via continuous casting, which is then formed into a billet having a generally square or rectangular shaped cross-section. The billet is generally in the form of a straight rod or bar. The billet may then undergo billet conditioning, in which the billet is inspected via ultrasonic testing. In the ultrasonic testing, transducers are disposed along the sides of the billet to detect internal defects (see FIG. 4A). Following the inspection of the bar or rod shaped billet at the mill, the bar or rod material is then coiled and packaged, having undergone this testing and certification process.

North American steel mills (NA mills) operate differently. In NA mills, the mills rely on clean steel making practices to reduce defects, but internal inspection is not performed, such that defects, including internal defects, may go undetected. This type of non-tested steel may be referred to as raw steel. The raw steel is coiled, similar to the coiling that occurs at the Japanese mills, and the raw steel from NA mills is supplied without inspection or certification. Such steel may be suitable for some uses, but may not be acceptable to certain manufacturers because of the potential of internal defects.

Steel from NA mills is less expensive to procure for North American manufacturers, and may therefore be more desirable. However, such steel may not be acceptable to customers of certain products, such as fasteners, without being certified as lacking defects.

SUMMARY OF THE DISCLOSURE

According to an aspect of the disclosure, a system for inspecting coiled wire includes: a wire drawer configured to draw wire from a coiled wire storage device; a first power feeder having a two-plane straightening device, the first power feeder disposed downstream from the wire drawer, wherein the first power feeder is configured to straighten wire received from the wire drawer; an ultrasonic inspection device disposed downstream from the first power feeder, the ultrasonic inspection device configured to receive straightened wire from the first power feeder and ultrasonically inspect the straightened wire for internal defects; a re-coiler disposed downstream from the ultrasonic inspection device, the re-coiler configured to receive inspected wire and to re-coil the inspected wire for storage.

In one aspect, the system includes a second power feeder disposed downstream from the ultrasonic inspection device, the second power feeder being offset relative to the first power feeder to create tension in the wire.

In one aspect, the system includes a snag detector device disposed upstream from the wire drawer, the snag detector device configured to monitor tension in the wire for detecting snags in the wire.

In one aspect, the system is configured to perform ultrasonic inspection to detect internal defects without cutting straight portions of the wire prior to inspection.

In one aspect, the re-coiler is disposed downstream of the second power feeder for re-coiling wire after straightening and inspecting the wire.

In one aspect, the ultrasonic inspection device includes shear wave transducers and incident wave transducers, wherein the transducers are rotated around the wire as the wire is fed through the inspection device.

In one aspect, the ultrasonic inspection device is a first ultrasonic inspection device and further comprising a second ultrasonic inspection device disposed in line with the first ultrasonic inspection device.

In one aspect, the ultrasonic inspection device is disposed on a slide table moveable laterally relative to a feed direction of the wire such that the inspection device is moveable out of a feed path of the wire.

In one aspect, the system includes a test rod, wherein the test rod includes internal defects at predetermined locations, wherein the test rod is configured for insertion into the ultrasonic inspection device when the inspection device is out of the feed path of the wire.

In one aspect, the test rod is mounted parallel to a feed direction of the wire and is linearly translatable parallel to the feed direction of the wire into the ultrasonic testing device.

In one aspect, the wire drawer, first power feeder, ultrasonic inspection device, and re-coiler are generally aligned along a generally straight feed path of the wire when viewed from above.

In one aspect, the system includes a coil of wire, wherein the wire is raw wire coiled at a storage device disposed upstream of the wire drawer, and the wire extends straight and continuously through the inspection device, wherein the wire is further coiled at the re-coiler, and wherein the wire extends continuously from the storage device to the re-coiler.

In another aspect of the disclosure, a method of ultrasonically inspecting a coiled wire includes: unspooling wire from a coil of wire at a storage device and defining unspooled wire; feeding the unspooled wire through a wire drawer and defining conditioned wire; feeding the conditioned wire through a first power feeder; straightening the conditioned wire via the first power feeder and defining straightened wire; feeding the straightened wire through an ultrasonic inspection device; performing ultrasonic inspection of an interior of the straightened wire to detect internal defects of the straightened wire via rotation of transducers around the wire as the wire is being fed; feeding the straightened wire through a second power feeder disposed downstream from the ultrasonic inspection device; after performing ultrasonic inspection of the straightened wire, re-coiling the straightened wire via a re-coiler.

In one aspect, the second power feeder is offset from the first power feeder, further comprising creating tension in the wire between the first and the second power feeder.

In one aspect, the ultrasonic detection device is a first ultrasonic detection device, further comprising detecting an internal defect via the first ultrasonic detection device and recording the location of the internal defect, feeding the wire into a second ultrasonic detection device and testing for the internal defect via the second ultrasonic detection device to confirm the defect or to define a false positive if the defect is not confirmed.

In one aspect, in response to confirming the defect, stopping the feed of the wire and removing a segment of the wire having the defect.

In one aspect, in response to defining a false positive, continuing to feed the wire through the system.

In one aspect, the wire extends continuously from the storage device, through the inspection device, and onto the re-coiler, wherein the wire at the storage device is raw wire.

In one aspect, the method includes performing ultrasonic inspection and detecting internal defects on straightened wire without cutting off straight portions of the wire prior to inspection.

In yet another aspect of the disclosure, a method for inspecting wire includes: unspooling a continuous length of wire from a first coil of wire and straightening the wire; after unspooling the wire and straightening the wire, performing ultrasonic inspection of a lengthwise portion of the wire and inspecting the interior of the lengthwise portion for internal defects, wherein the lengthwise portion of the wire remains part of a continuous length of wire; re-coiling the continuous length of wire after inspection and defining a second coil of wire, wherein the second coil of wire is defined by ultrasonically inspected wire; wherein the first coil of wire is raw wire.

DETAILED DESCRIPTION OF THE DISCLOSURE

Figure 1A:
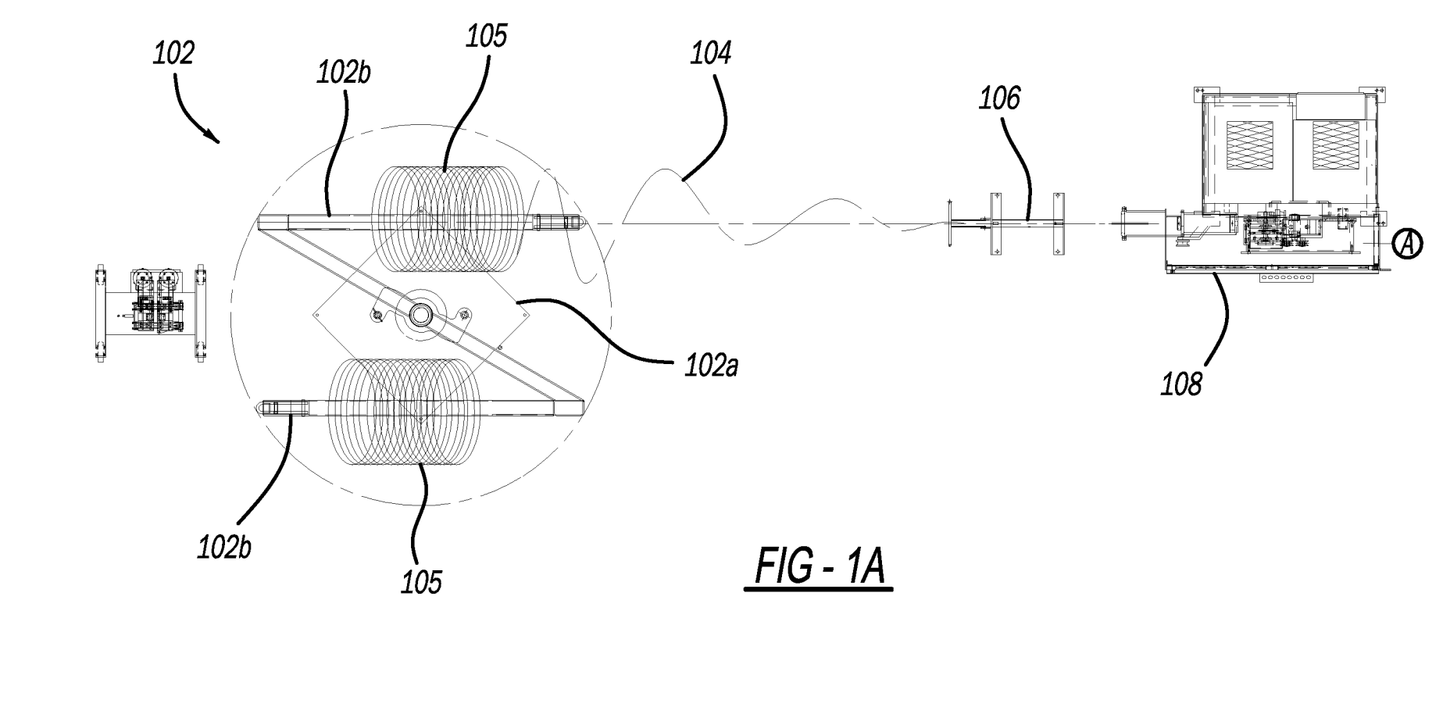
FIGS. 1A-1B illustrate a top view of a coiled wire inspection system, with the figures linked by bubble "A"
Figure 1B:
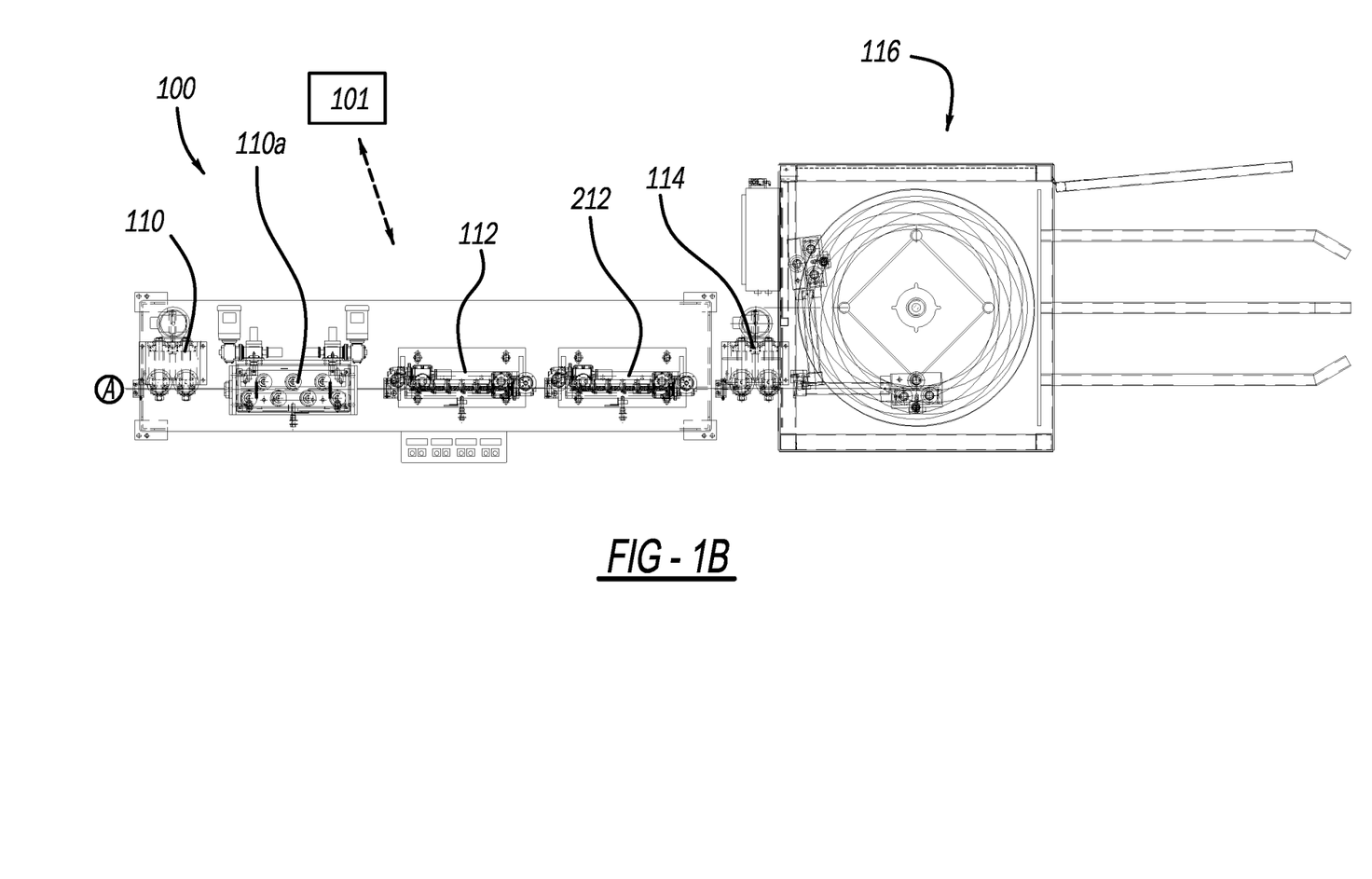
Figure 2A:
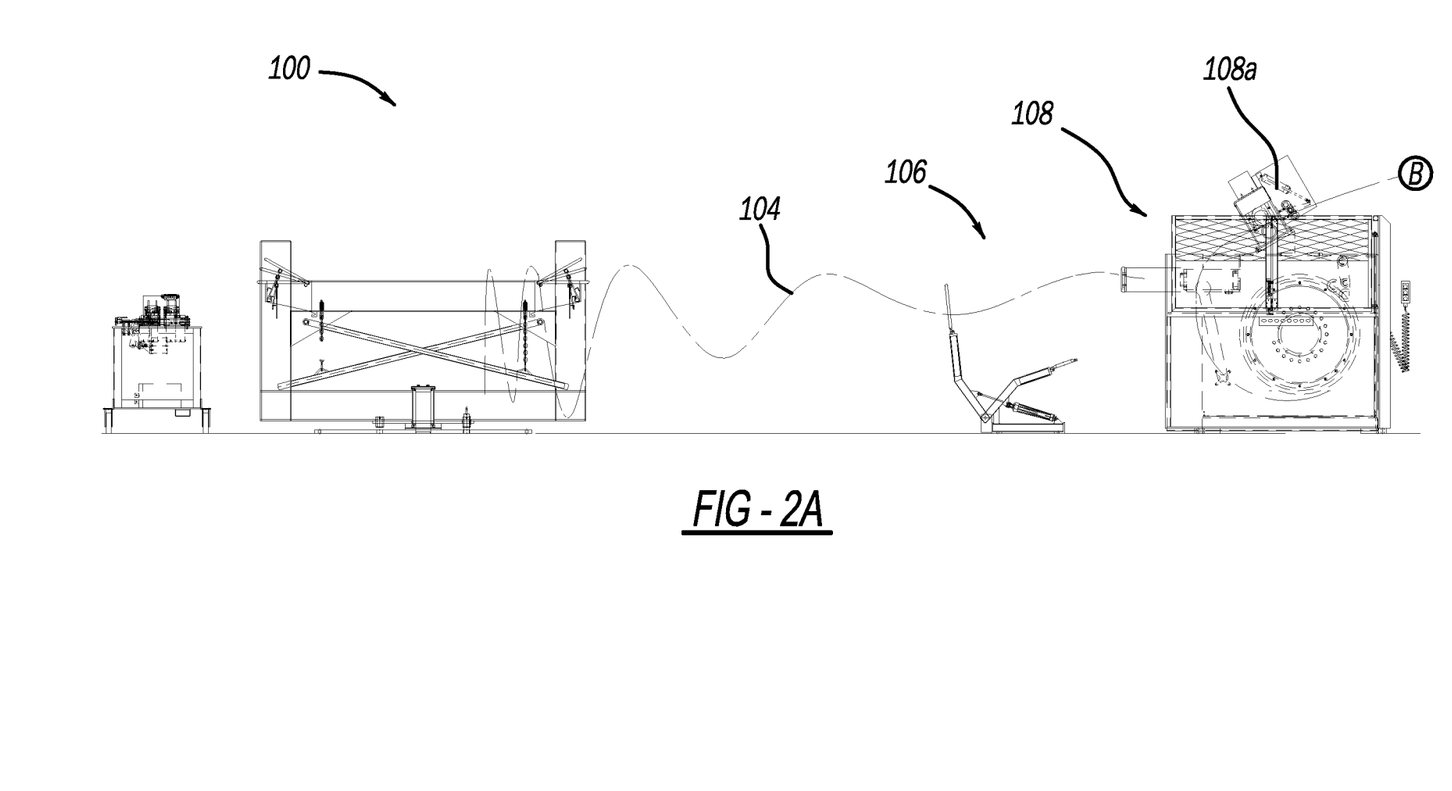
FIGS. 2A-2B illustrate a front view of the coiled wire inspection system, with the figures linked by bubble "B"
Figure 2B:
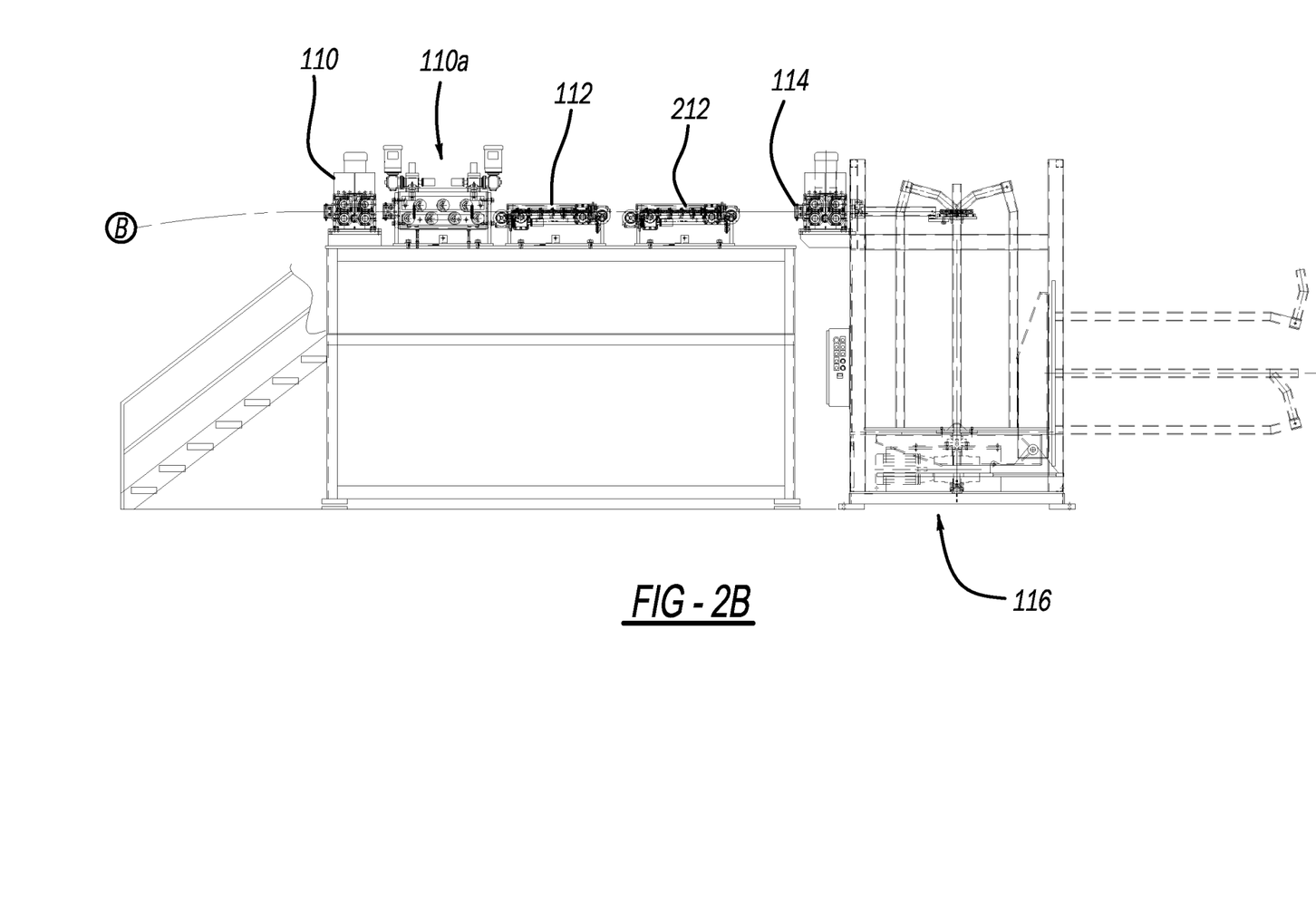

With initial reference to the FIGS. 1-2, a system 100 for inspecting coiled wire, in particular previously coiled raw steel wire, is disclosed. The system 100 may include a computing device or controller 101, which includes hardware, software, and the like configured for controlling the various connected components send and receive signals relative to the controller 101. The system 100 includes storage device 102 for storing coiled wire 104, a snag detector device 106, a wire drawer 108, a first power feeder 110, an ultrasonic inspection device 112, a second power feeder 114, and a re-coiler 116. The wire of the coiled wire may be approximately 6-18 mm in diameter, in one aspect.

The system 100 is arranged in a generally linear fashion and may be disposed, for example, on a typical production floor common to industrial facilities. The wire 104 is fed through the system from left to right in Figures and 1A-B and 2A-B. The system 100 illustration is linked between FIGS. 1A and 1B via bubble "A". The system 100 illustration is linked between FIGS. 2A and 2B via bubble "B." The system 100 is generally arranged in a straight configuration due the wire 104 that is being fed through the system 100 being straightened within the testing segment of the system 100. Accordingly, arranging the various stations of the system 100 linearly may be preferable for simplicity and to reduce the need to feed wire around turns or the like. However, it will be appreciated that some stations may be disposed offset from the system 100 such that the wire 104 may be fed around a corner so long as the wire 104 may be straightened through the testing segment of the system 100, as it is understood that different facilities may have different floor space arrangements. It is further appreciated that the direction of feeding the wire is not precisely linear as shown, with the wire 104 rising and falling along the path, and shifting slightly laterally between some stations.

Wire 104 that is received from NA mills is typically stored in a coiled fashion. When the wire 104 is coiled, the wire may be referred to as a coil 105. Wire may therefore be referenced as either wire 104 or coil 105 herein, depending on the context of the disclosure, but it will be appreciated that reference to coil 105 includes reference to the wire 104 in a coiled form. Similarly, as wire 104 becomes unspooled or uncoiled form the coil 105, the coil 105 will become smaller. Wire 104 will proceed from its coil 105 to be processed and then re-coiled at the end of the process, according to an aspect of the disclosure.

The system 100 is preferably disposed adjacent or near a wire storage area of the facility in which the system 100 is disposed. The wire storage area may be an area in which various coils 105 of wire 104 are stored or otherwise held for being later processed, tested, and/or treated. However, given various storage needs or just in time manufacturing methods, coils 105 may also be delivered directly to the system 100 or from remote storage areas as necessary. The coils 105 may undergo some treatments prior to undergoing the inspection process described herein, and such treatment areas may also be disposed near the system or storage area of the coils 105.

Coils 105 may be arranged on storage device 102 for subsequent unspooling of the wire 104 via the system 100. Storage device 102 may be in the form of a rotatable frame 102a having a pair of supports 102b in opposite sides of the central shaft of the frame 102a. The supports 102b may be generally horizontal and may include retention features for holding the coils 105 thereon, while allowing the wire 104 be unspooled from the coil 105 as it is being fed through the system 100.

In use, one of the supports 102b of the storage device 102 may face the downstream components and stations of the system, while the opposite support 102b faces away from the system 100. Thus, as one of the coils 105 is being unspooled by the system 100, the support 102b facing away from the system 100 can be loaded with another coil 105 to be unspooled next. A butt-welder may be disposed adjacent the storage device 102 for joining the end of one coil 105 to another.

Following the unspooling of the coil 105 facing the system, the storage device 102 may be rotated about its axis such that the empty support 102b faces away from the system 100, and the previously loaded support 102b, having another coil 105 thereon, now faces the system 100, and the next coil 105 can be unspooled and fed through the system 100 for inspection.

As described herein, the system 100 and its associated method is operable to feed the coiled wire 104 from the storage device 102 and through the system 100. As the wire 104 is unspooled, it can be possible that the wire 104 may become snagged on the storage device 102 or another system mechanism. Thus, system 100 includes snag detector 106 disposed downstream from the storage device 102. Snag detector 106 is configured to detect tension in the wire 104 as it being fed through the snag detector 106. Accordingly, in the event of a snag in the wire 104, tension in the wire will increase, and snag detector 106 will detect the increased tension in the wire 104 and send a signal to the system 100 regarding the increased tension. The system 100 may shut down or respond otherwise as desired.

Wire 104 is generally unspooled in response to the wire 104 being fed or pulled through the system 100 by the downstream components of the system. Additionally, with wire 104 being stored as coil 105, as the wire 104 begins to unspool, the wire 104 itself may begin to unspool or spring outward in response to built-up bias in the wire 104 as a result of coiling the wire 104 into the coil 105. In this case, wire 104 is generally not in high tension, with tension in the wire 104 increasing as it moves further into the system 100 from the coil 105.

Following unspooling from the coil 105, the wire 104 is fed into wire drawer 108. Wire drawing devices or mechanism are generally established, and are configured to condition the wire 104 to a tighter tolerance relative to the raw wire 104 that was in the coil 105 on the storage device 102. The wire drawer 108 may be configured to condition wires of various diameters. In one aspect, the wire drawer 108 may draw wire diameters from 0.062 to 1.375 inches, or M6-M24 wire sizes. Additional wire sizes may also be drawn. The wire drawer 108 also provides a feeding force on the wire 104, such that the wire 104 is pulled through the wire drawer 108 by the wire drawer 106 itself, according to an aspect of the disclosure. Accordingly, the wire drawer 108 adds tension to the wire 104 relative to the coil 105. The tension provided by the wire drawer 108 is known, and the snag detector 106 may be set and configured according to the expected tension in the wire 104.

Wire 104 enters wire drawer 108, in which the wire 104 is conditioned according to the settings of the wire drawer 108 to draw the wire 104 to the desired tolerance. Wire 104 thereafter exits the wire drawer 108 and is fed toward the first power feeder 110. Wire drawer 108 may include a canted feed head 108a that directs and feeds the wire 106 at an angle toward the first power feeder 110, which may be disposed above the wire drawer 108 on a platform or the like.

Following its exit from the wire drawer 108, the wire 104 is fed to the first power feeder 110. First power feeder 110 pulls wire 104 from the wire drawer 108, and is configured to both feed and straighten the conditioned wire 104 after the wire 104 has been conditioned by the wire drawer 108. First power feeder 110 includes a two-plane straightener 110a configured to straighten the wire 104 as is passes through the first power feeder 110.

Figure 3A:
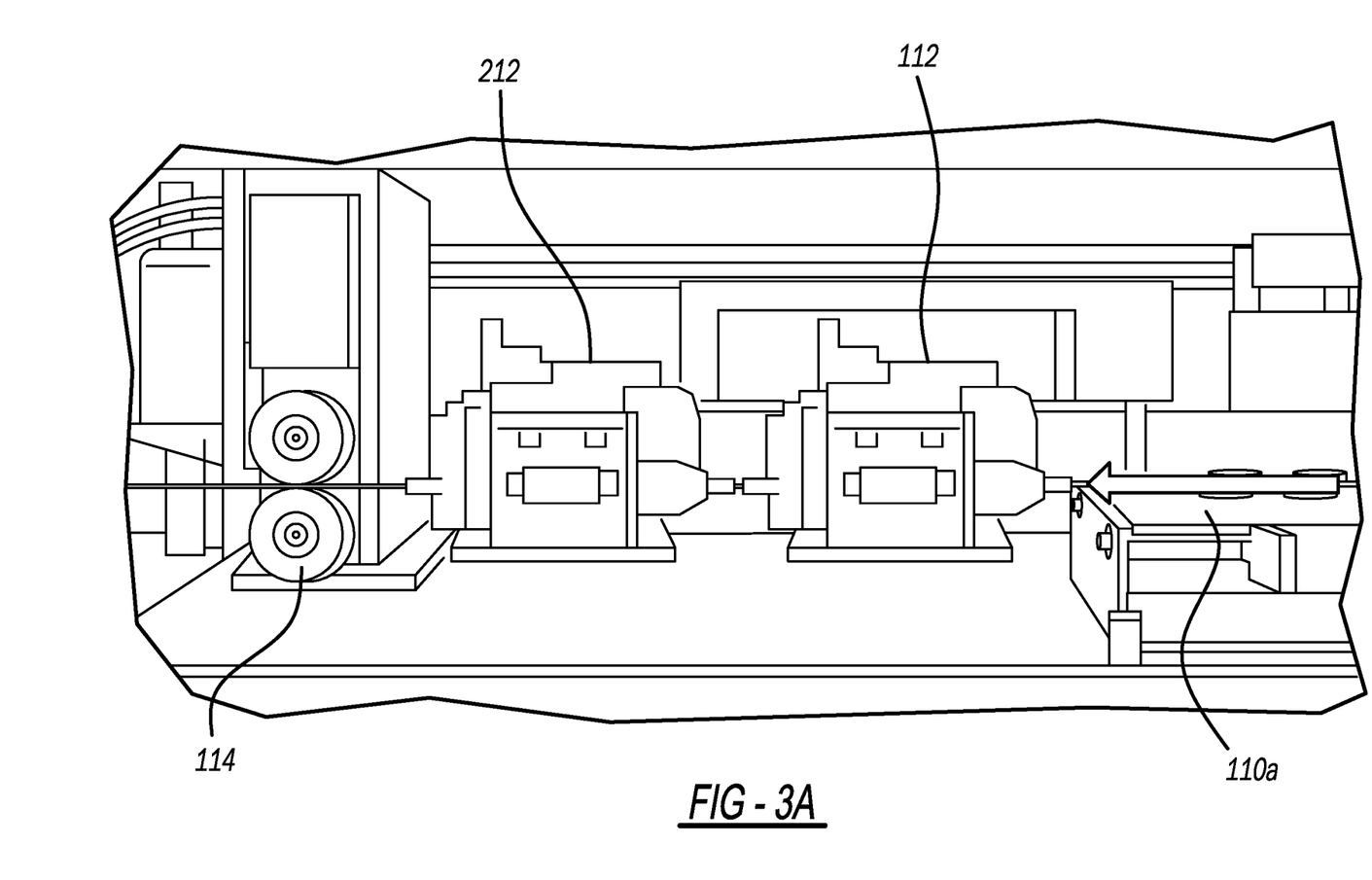
FIG. 3A illustrates a pair of ultrasonic inspection devices of the system.
Figure 3B:
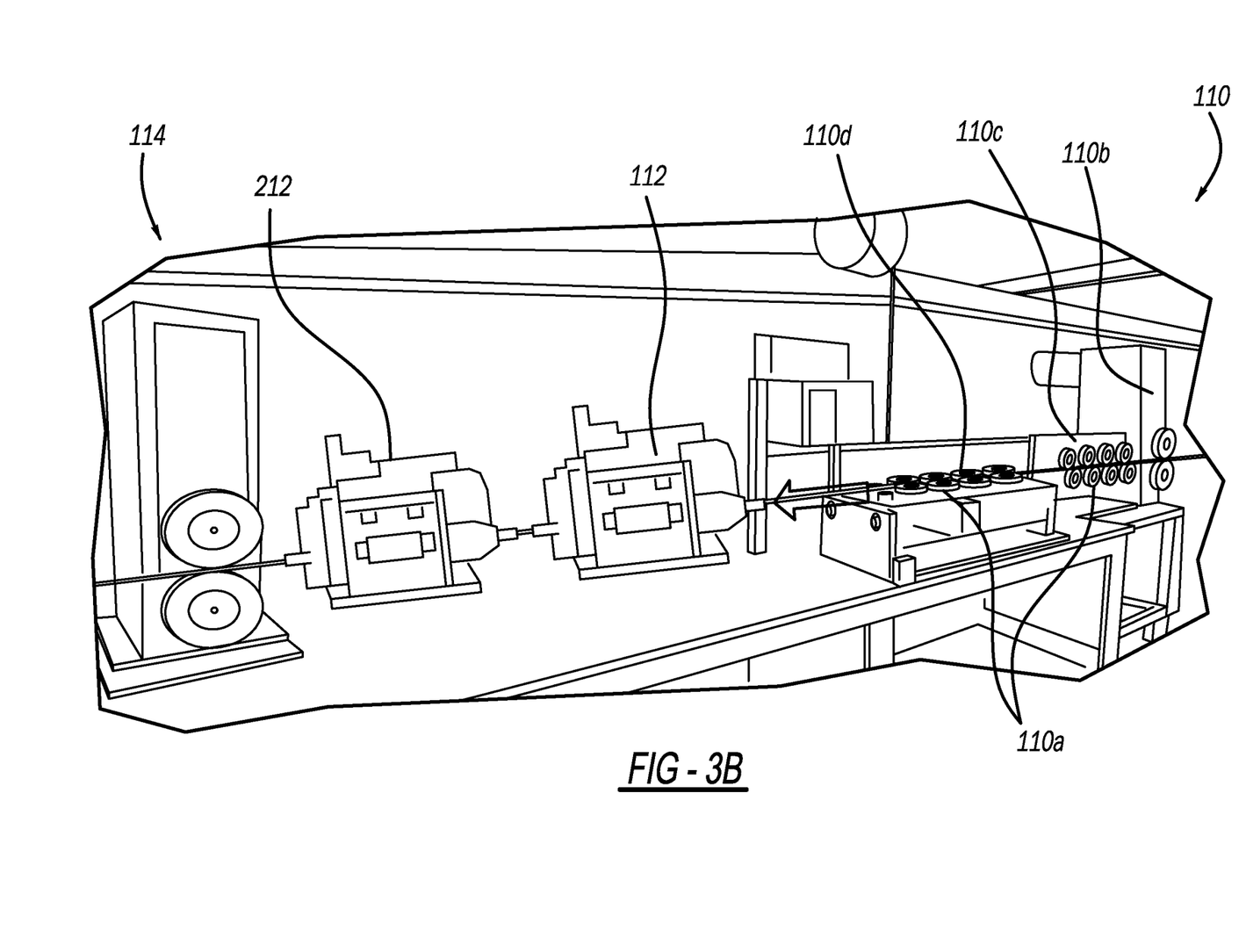
FIG. 3B illustrates a perspective view of the ultrasonic inspection devices between a first power feeder and a second power feeder of the inspection system.

In one aspect, first power feeder 110 includes a set of feed rollers 110b oriented along a first plane, such as a vertical plane, as shown in FIG. 3B. Two-plane straightener 110a includes a first set of straightening rollers 110c downstream from the feed rollers 110b. The first set of straightening rollers 110c may be oriented in a first plane, such as a vertical plane, as shown in FIG. 3B. A second set of straightening rollers 110d is disposed downstream from the first set 110c, and is oriented in a second plane (the horizontal plane), as shown in FIG. 3B. It will be appreciated that the each set of rollers may include more or fewer rollers than those illustrated, and that the planes may be arranged differently (vertical, horizontal, or between). In one aspect, the first and second planes of the two-plane straightener 110a are generally perpendicular.

The two-plane straightener 110a therefore is operable to create a straightened section of the wire 104, after the wire 104 has been conditioned by the wire drawer 108, such that the straightened section 104 can be properly inspected for internal defects. It will be appreciated that the straightened section of the wire 104 is substantially straight. In one aspect, reference to straight or substantially straight refers to a section of the wire 104 that is straight within 1 mm per meter after the wire 104 exits the first power feeder 110 and the two-plane straightener 110a.

Following its exit from the first power feeder 110 and straightener 110a, wire 104 proceeds to the ultrasonic inspection device 112, shown disposed between first power feeder 110 and second power feeder 114 in FIG. 3B. To this point in the system 100, the wire 104 has not undergone any testing for internal defects. However, the portions of the wire 104 that have already passed through the system 100 will have undergone testing for the defects. The wire 104 is generally continuously fed through the system 100 (aside from instances where the system 100 is paused, such as for a detected snag or a detected defect, further described below).

Because the wire 104 is continuously fed, the wire 104 will include both tested and untested portions while present in the overall system 100. Generally, untested portions of the wire 104 are the portions of the wire that are upstream of the inspection device 112, and tested portions of the wire 104 are the portions of the wire that are downstream from the inspection device 112. Of course, due to the continuous feeding of the wire, the untested portions become tested portions. Untested portions can include wire states that are pre-conditioned, post-conditioned, straight, and/or coiled. Tested portions are post-conditioned and post-tested, and can includes wire states that are straight and/or coiled.

Figures 4A, 4B, 4C:
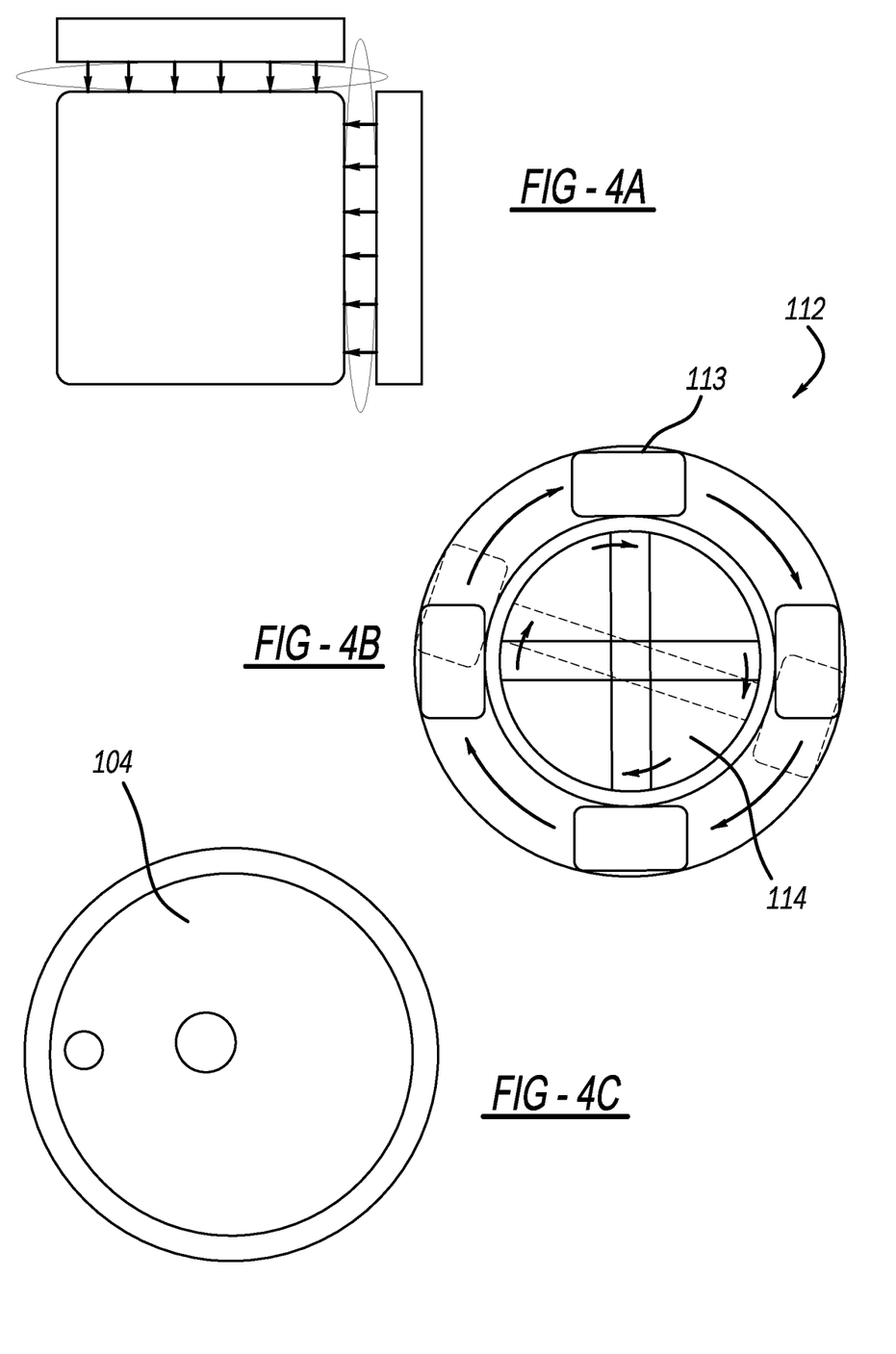
FIG. 4A illustrates a schematic end view of a prior art inspection system for inspecting rectangular cross-section billets.
FIG. 4B illustrates a schematic end view of the ultrasonic inspection device according to an aspect of the disclosure.
FIG. 4C illustrates a schematic cross-sectional view of a wire having internal defects.

The wire 104, now straight after passing through the first wire feeder 110 and the two-plane straightener 110a, is fed into and through the ultrasonic inspection device 112, which performs ultrasonic inspection on the straight wire 104. FIGS. 4B and 4C illustrate an example of the inspection device 112 and internal defects within the wire 104. The ultrasonic inspection device 112 is configured to inspect the straight section of wire 104 for internal defects, such as subcutaneous and core defects. Subcutaneous defects are those that are adjacent the outer edge (about 18% of the diameter) of the wire 104, and can be more difficult to detect using other inspection methods. When passing through the inspection device 112, the inspection elements (transducers 113) may rotate around the wire 104, such that the wire inspected from multiple angles continuously. Accordingly, inspection dead zones are eliminated. FIG. 4A illustrates a prior art inspection system used on rectangular billets, such as those used at Japanese mills, which includes dead zones along the edges of the billet and in the corners or the billet.

Figure 5A:
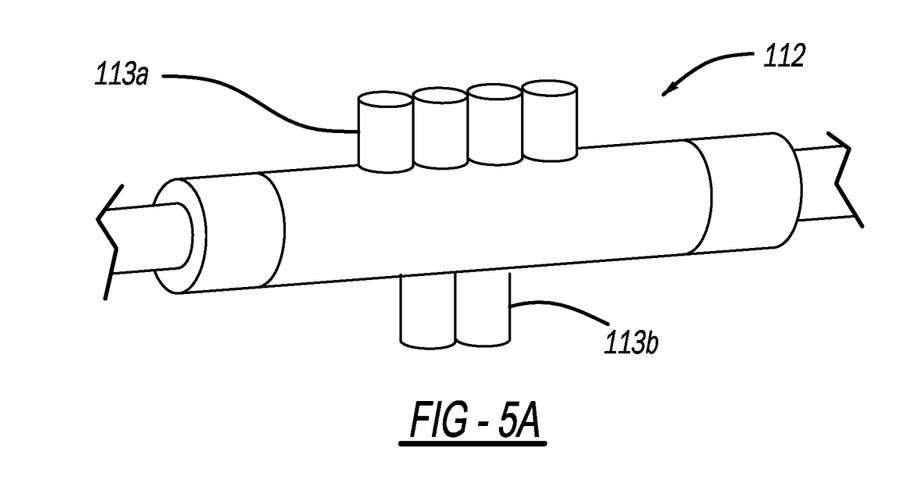
FIG. 5A illustrates a perspective view of transducers of the inspection devices that are configured to rotate about the wire.
Figure 5B:
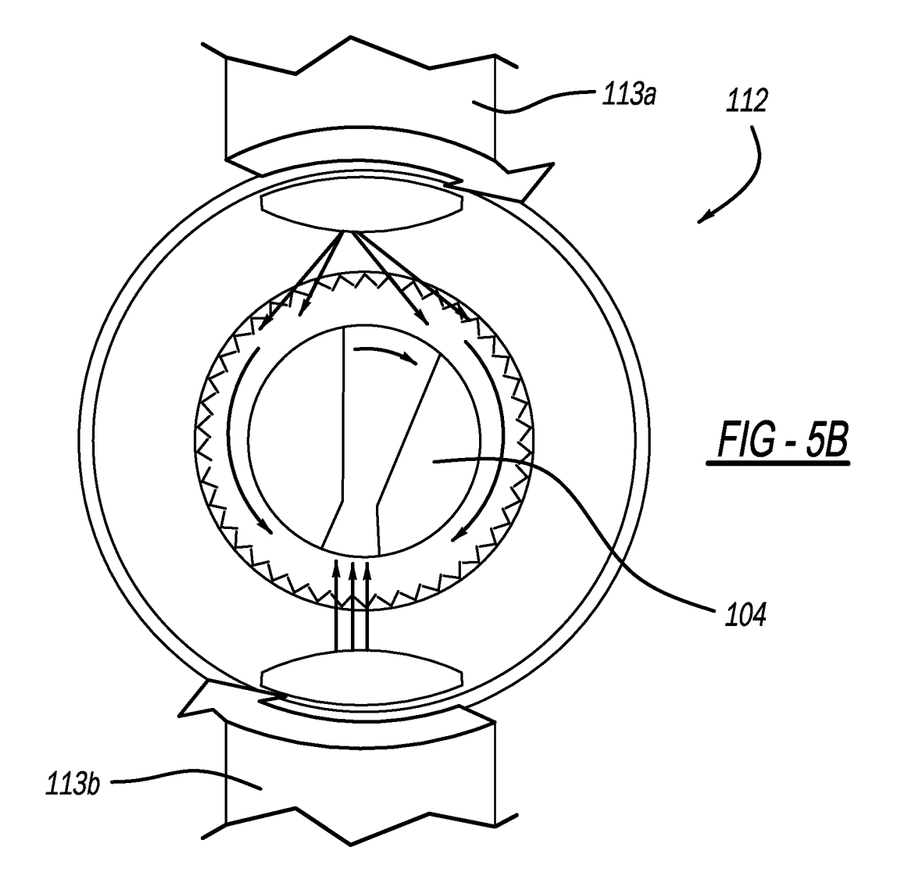
FIG. 5B illustrates a schematic end view of the ultrasonic inspection device illustrating the rotatable transducers that emit incident or shear waves to detect internal defects of the wire.

With reference to FIGS. 5A-5B, both incidence waves and shear waves are used for the ultrasonic inspection, and the transducers 113 rotate around the wire 104, which is surrounded by a water couplant. In addition to internal defects, surface defects can also be detected. In one example, four subcutaneous/surface transducers 113a are disposed on one side and two incident transducers 113b are disposed on the opposite side. The transducers 113 are attached to a rotatable housing, which can rotate at about 8000 RPM in one example. The subcutaneous transducers 113a emit angled "shear waves" while the incident transducers 113b emit incident waves (normal to the wire 104).

The amount of volume coverage of the inspection device 112 depends on the feed rate of the wire 104. In one aspect, with the wire 104 being fed at about 50 meters/min, 100% volume coverage is obtained. In another aspect, with the wire 104 being fed at 25 meters/min, 200% volume coverage is obtained. Accordingly, feed rate may be adjusted depending on the desired level of coverage for the ultrasonic inspection. One type of ultrasonic inspection device 112 is the ultrasonic detection device manufactured by Magnetic Analysis Corporation. Ultrasonic inspection can be performed to different classifications. The disclosed system 100 is capable of Class A ultrasonic detection (0.8 mm minimum defect size).

Thus, as the wire 104 passes through the inspection device 112, the inspection device 112 operates to detect potential internal defects. In the event of detection of a defect, the system 100 is configured to confirm and/or remove the section of wire 104 that includes the defect, as further described below.

One potential issue in the detection of defects is the case of a false positive. For example, if the system 100 detects a defect, but the defect is not actually present, the detection is a false positive. However, in the event of a detection of a defect, it can be difficult to reverse the wire 104 back through the inspection device 112 and pass the wire 104 through the inspection device 112 each time a defect is detected. Additionally, in the event of a confirmed defect, it is time consuming to stop the system 100 such that the defective section of the wire 104 can be marked and/or removed from the supply of wire 104.

As described above, the wire 104 is being continuously fed through the system 100 and through a variety of stations that pulls the wire, conditions the wire, straightens the wire, scans the wire, etc. Accordingly, it can be advantageous to confirm the existence of the defect before stopping the continuous feed of the wire 104, and it is similarly advantageous to avoid reversing the feed direction to check the wire 104 a second time.

According to an aspect, the system may include a second inspection device 212. Second inspection device 212 may operate in the same fashion as the first inspection device 112. In one aspect, second inspection device 212 is disposed downstream and adjacent first inspection device 112. Accordingly, wire 104 that has been scanned at the first inspection device 112 will exit the first inspection device 112 and enter the second inspection device 212. Second inspection device 212 will scan the same section of the wire 104 that was previously scanned in the first inspection device 112.

In the event of a defect that is detected by the first inspection device 112, the system 100 will flag the location of the wire 104 where the defect was detected. The location of the wire 104 may be stored in the controller 101 of system 100, and based on the known feed rate of the wire 104 through the system 100, the same defect location is checked and scanned by the second inspection device 212. In the event that the second inspection device 212 detects a defect in the same location, the system 100 may determine that the defect is present. In response to determining that the defect is present, and that it is not a false positive, the system 100 can pause the feed of the wire 104 through the system 100 such that the defective location can be marked and/or removed from the supply of wire 104.

In the event that no defect is detected by the first inspection device 112 at a given location, the second inspection device 112 can nevertheless detect a defect at that given location. However, because the first detection device 112 did not detect a defect, the detection of a defect only by the second device 212 can be considered a false positive, similar to a defect that is detected by the first device 112 but not confirmed by the second device 212.

It will be appreciated that additional inspection devices can be added to further confirm the existence of a defect and/or detect false positives, and that the conditions for whether or not to stop the feed of the wire 104 through the system may be tailored to suit the desires of the user and manufacturing standards and/or practices.

For example, in one aspect, if the manufacturer desires to remove a section of the wire 104 in the event of detecting a defect at only one of multiple inspection devices, the feed may be stopped whether the defect is detected at the first or second inspection device 112/212.

Regardless of the conditions under which the determination to stop the line and mark/remove the section of the wire 104 having the defect, upon determining that the defect should be addressed, the line is stopped or slowed. Subsequently, the wire 104 can be jogged or advanced forward out of the inspection station of the system 100. The defective portion, which is known based on the time of detection and the feed rate of the wire, may be advanced to a predetermined location. The defective section of the wire 104 may then be marked. For example, the section may be painted manually or automatically, such as via spray paint or the like. With the section marked as defective, the wire feed may therefore be resumed, and additional portions of the wire 104 will be inspected. In the event of a further defect at a later section of the wire 104, the process can be repeated, where the defective section can be advanced to a predetermined location and painted or otherwise marked as including a defect.

In another aspect, in addition to or alternative to marking/painting the defective section of the wire 104, the defective section may be removed, such that only wire sections that are defect free (meaning lacking a confirmed defect) will continue through the system 100. In one aspect, after marking or painting the wire 104, the wire 104 may be advanced to another predetermined location, where the marked or painted section indicating the defect is removed.

Accordingly, there are various responses to the detection of defects via the inspection devices 112, 212. Having described the possible responses to the detection of a defect, the system 100 will now continue to be described with regard to not detecting a defect and continuing to feed the wire 104 through the system. For purposes of continued discussion, only a single inspection device 112 will be described, but it will be appreciated that multiple in-line inspection devices 212 may also be used.

After passing through the ultrasonic inspection device 112 (or devices), the wire 104 is fed to and through the second power feeder 114. Second power feeder 114 may be offset from the first power feeder 110 such that the wire 104 extending therebetween is kept in tension to maintain straightness of the wire 104 after the straightened wire 104 exits the first power feeder 110 and passes through the ultrasonic inspection device 112. The second power feeder 114 may include a set of rollers 114a, similar to the first set of rollers 110a of the first power feeder 110. The set of rollers 114a may be operated "offset" relative to the first set of rollers 112a of the first power feeder 110, such that the wire 104 that has been straightened by the two-plane straightener remains in tension and straight while being fed through the inspection device 112.

Both the first and second power feeders 110, 114 may be servo-controlled for precise positioning via saved settings in the system depending on wire size. The two-plane straightener of the first power feeder 110 may be similarly servo-controlled. Depending on the size of the wire 104 being fed through the system, the various rollers of the first and second power feeders 110, 114 may be switched. In one aspect, two sets of rollers may be switched out and replaced. For example, one set of rollers may be used for wire 104 that is less than M12, and another set of rollers may be used for wire 104 that is greater than or equal to M12. Rollers may be removed and/or installed via overhead crane, if necessary. The system 100 may be operable for a variety of wire sizes, including at least 16 different wire sizes from M6 to M18, as well as additional sizes including M24, according to an aspect of the disclosure. During the process, which includes the unspooling, drawing, testing, and re-coiling, the diameter of the wire 104 is reduced slightly, from about 11% for M6 to 4% for M18, according to an aspect of the disclosure. While 16 standard draw sizes may be used, additional sizes may be added.

The speed of the inspection process depends on the feed rate, which can depend on the size of wire being inspected. For M6 wire, about 1,329 lbs/hour can be inspected. For M18, about 10,526 lbs/hour can be inspected. At a 40 m/min scan speed, about 3,897 lbs/hour can be inspected. In one aspect, the system can scan at up to 100 m/min, but typically will scan at about 35-40 m/min.

Following the second power feeder 114, the wire 104, now having been conditioned, straightened, and inspected (without detected defects), is fed onto re-coiler 116. Re-coiler 116 can be a known mechanism for receiving straight wire and coiling the straight wire into a coil (similar to coil 105). Thus, re-coiler 116 takes the straight wire 104 and re-coils it for storage and provision to other downstream processing, as desired. For example, the wire 104, after being re-coiled, can thereafter be providing to a fastener manufacturing system to create fasteners that can be certified as being formed from steel meeting customer requirements or manufacturing standards. In one aspect, the re-coiler 116 is pivotable between an upright position and a lowered position. In the upright position, the wire 104 may be looped onto the re-coiler 116, with the loops laid in a random pattern. Once the coiling process is complete (such as the entire wire being fed through the system 100, or the wire 104 being cut to remove a defect and shortening the wire 104, or the coil becoming "full"), the re-coiler 116 may be pivoted to its lowered position, and the coil 116 may be removed.

Depending on the timing of when a defect is detected in the wire 104 during the feed process, the wire 104 may ultimately not be coiled. For example, if only a short amount of wire 104 has passed through the system prior to a defect being detected and removed from the wire 104, the amount of wire 104 at the beginning of the process may be too short to be worth coiling and providing to a customer. Similarly, if the amount of wire 104 remaining at the end of the feed is too short, that portion may be discarded along with the defective section. Whether or not to discard portions of the wire 104 that lack defects due to the length of the defect-free section can be determined based on user preference. In one aspect, all lengths of defect-free wire may be retained, if not necessarily coiled on the re-coiler 116.

The above system 100 can therefore inspect wire in a fast and efficient process. The rate at which the wire 104 is fed through the system can vary depending on the needs of the user. The slower the wire 104 is fed, the more accurate the defect detection can be, reducing the instances of false positives or negatives. However, feeding the wire at a slower speed reduces the overall amount of wire that can tested in a given amount of time. Accordingly, system users may weight these considerations in determining the best balance of speed and accuracy for their particular needs.

In one aspect, multiple types of "raw" wire coils 105 can be butt-welded together at the storage device 102, such that after one "raw" coil 105 of wire 104 is exhausted and fully fed through the system 100, a second "raw" coil of wire can be automatically and/or quickly fed through the system 100. The end of the first wire 104, being attached to the beginning of the second wire 104, can cause the storage device 102 to rotate as the wire 104 is being pulled. After rotation, the next coil 105 can be loaded onto the storage device 102, and can also be butt-welded to the coil 105 that is presently active. This process can continue to be performed such that subsequent coils 105 can be efficiently processed.

The reliability and certification of the wire 104 as being defect free depends on the inspection device 112 operating as expected to detect defects in the wire. Accordingly, with reference to FIGS. 6A and 6B, the inspection device 112 can undergo periodic and/or frequent testing to confirm that the device 112 is operating correctly and detecting defects. To test the inspection device 112, a straight rod or bar, referred to as a test rod 130 may be inserted into the inspection device 112 in manner similar to the wire 104. As the test rod 130 is inserted, the inspection device 112 may be activated to detect defects in the test bar 130. The test bar 130 may include a plurality of known internal defects. Accordingly, the inspection device 112 is expected to detect the known defects and their known locations after the test rod 130 has been inserted. In one aspect, the test rod 130 can be about 6 feet long. The length of the test bar 130 may be adjusted depending on the number of inspection devices. For example, if a second inspection device is present, the test bar 130 may be inserted into both inspection devices.

According to an aspect, testing of the inspection device 112 may occur both before and after a production run of the wire 104. Accordingly, testing may be performed frequently. Due to the other components of the system 100 being arranged adjacent the inspection device 112 and in line with the inspection device, access for the testing rod 130 may be difficult in order to insert the test rod 130 in a straight line like the wire 104 (which is much longer and supported at opposite ends by the power feeders 110, 114.

Figure 6A:
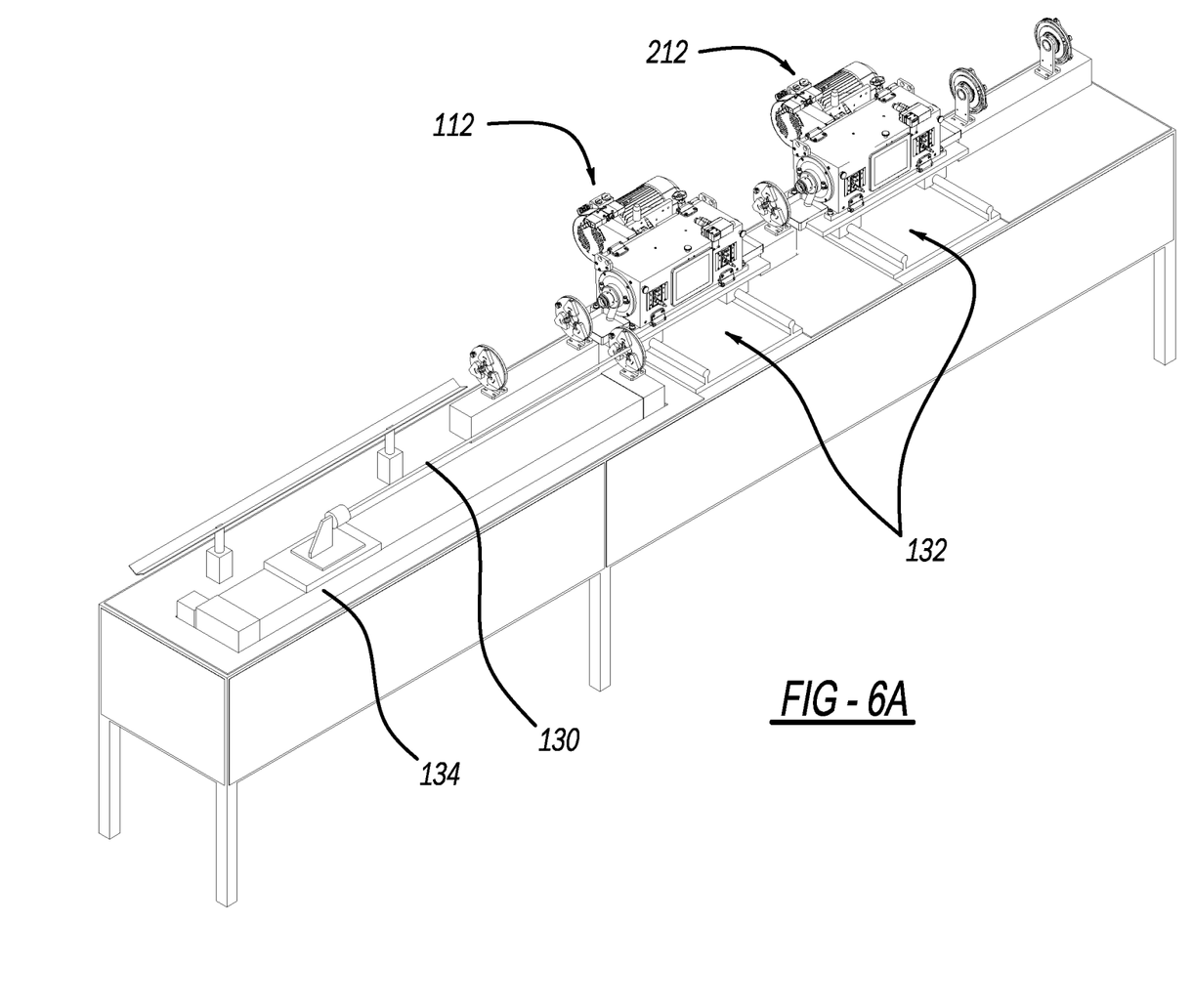
FIG. 6A is a perspective view of the ultrasonic inspection device on a slide table and a linearly translatable test rod for verifying operation of the inspection device.
Figure 6B:
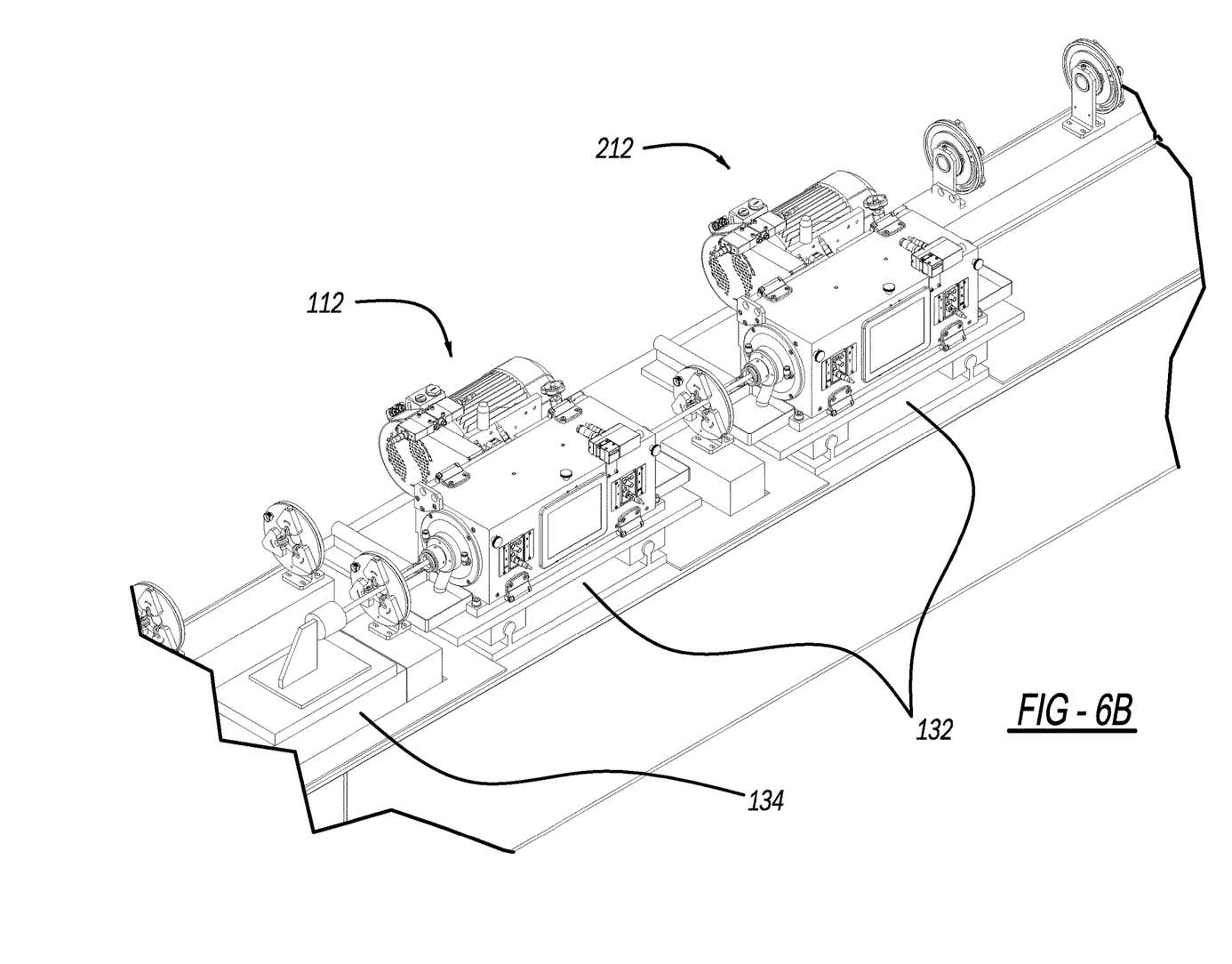
FIG. 6B illustrates the inspection device shifted laterally via the slide table and the test rod in a translated position and inserted into the inspection device.

In one aspect, the inspection device 112 is disposed on a slide table 132. The slide table 132 is configured to slide laterally relative to the feed direction of the wire 104. The test rod 130 may be disposed on test table 134 that is laterally adjacent the area of the inspection device 112. Accordingly, when the inspection device 112 slides laterally via the slide table 130, the inspection device 112 is aligned with the test rod 130. The test rod 130 may thereafter be inserted easily (via linear actuator) into the inspection device 112 for testing. The testing of the inspection device 112 can therefore be performed quickly such that production runs can resume. The testing process 112 can confirm that the inspection device 112 is expected to operate correctly on the next run, and can further confirm that the run that was just completed was valid. In the event the testing fails, the wire 104 from the previous production run can be flagged, and the inspection device 112 can be serviced or replaced prior to the next production run.

The above-described system 100 therefore provides a robust and efficient mechanism for inspecting wire that had been coiled prior to conditioning or internal inspection, such as wire provided by NA mills. The above-described system 100 provides a more efficient alternative to manufacturing fasteners from certified steel, because the material can be sourced locally rather than from mills in Japan or other mills that perform testing during the billet conditioning process.

The inspection process described herein is one aspect of an overall wire production process, which can include additional treatment of the wire 104 before or after testing. Regardless of levels of pre-processing, the wire 104 prior to being inspected for defects can be referred to as "raw" wire. The above described process provides a novel approach to inspecting raw bar steel ultrasonically, as opposed to the Japanese inspection of billets. The above process straightens raw coiled wire and verifies and inspects the wire 104 as it is conditioned and re-coiled, thereby meeting manufacturing requirements without costly overseas billet inspection.

In one aspect, the coil 105 and wire 104 are cleaned and drawn prior to inspection. In one aspect, due to limitations in annealing processes, coils 105 may include mill scale to avoid decarburization. Therefore, coils 105 may be annealed prior to cleaning, drawing, and inspection. In one aspect, coils 105 and wire 104 are drawn with oil to reduce lime spray. In one aspect, the inspection device 112 may use soluble oil to prevent, reduce, or otherwise limit rust after inspection. Following inspection, the wire 104 may be cleaned, lime coated, and banded.

In one aspect of an overall production method, hot rolled steel wire from the mill is received. The hot rolled steel wire then undergoes secondary wire processing, which can be either a "normal" method in which the ultrasonic testing described above is not performed, or the secondary wire processing can be the ultrasonic testing method described above. In the ultrasonic testing (UST) method, the coils 105 and wire 104 undergo spheroidize annealing, followed by pickling, followed by the UST inspection, followed by coating. In the "normal" method, the coils 105 and wire 104 undergo spheroidize annealing, cleaning, and coating. Following the secondary wire processing, whichever method is used, the wire 104 undergoes cold forming (heading/rolling), HT/plating, and inspection/packing.

What is claimed is:

1. A system for inspecting coiled wire, the system comprising:
    a wire shaping and conditioning device that conditions the wire to a tighter tolerance relative to the raw wire, configured to shape and condition wire received from a coiled wire storage device;
    a first power feeder having a two-plane straightening device, the first power feeder disposed downstream from the wire shaping and conditioning device, wherein the first power feeder is configured to straighten wire received from the wire shaping and conditioning device, wherein the first power feeder includes driven feed rolls that actively pushes and/or pulls the wire therethrough and drives the wire through the system;
    an ultrasonic inspection device disposed downstream from the first power feeder, the ultrasonic inspection device configured to receive straightened wire from the first power feeder and ultrasonically inspect the straightened wire for internal defects;
    a re-coiler disposed downstream from the ultrasonic inspection device, the re-coiler configured to receive inspected wire and to re-coil the inspected wire for storage.

2. The system of claim 1 further comprising a second power feeder disposed downstream from the ultrasonic inspection device, the second power feeder being offset relative to the first power feeder to create tension in the wire, wherein the second power feeder includes driven feed rolls that actively pushes and/or pulls the wire therethrough and drives the wire through the system.

3. The system of claim 1 further comprising a snag detector device disposed upstream from the wire shaping and conditioning device, the snag detector device configured to monitor tension in the wire for detecting snags in the wire.

4. The system of claim 1, wherein the system is configured to perform ultrasonic inspection to detect internal defects without cutting straight portions of the wire prior to inspection.

5. The system of claim 2, wherein the re-coiler is disposed downstream of the second power feeder for re-coiling wire after straightening and inspecting the wire.

6. The system of claim 1, wherein the ultrasonic inspection device includes shear wave transducers and incident wave transducers, wherein the transducers are rotated around the wire as the wire is fed through the inspection device.

7. The system of claim 1, wherein the ultrasonic inspection device is a first ultrasonic inspection device and further comprising a second ultrasonic inspection device disposed in line with the first ultrasonic inspection device.

8. The system of claim 1, wherein the ultrasonic inspection device is disposed on a slide table moveable laterally relative to a feed direction of the wire such that the inspection device is moveable out of a feed path of the wire.

9. The system of claim 1, wherein the wire shaping and conditioning device, first power feeder, ultrasonic inspection device, and re-coiler are generally aligned along a generally straight feed path of the wire when viewed from above.

10. The system of claim 1, further comprising a coil of wire, wherein the wire is raw wire coiled at a storage device disposed upstream of the wire shaping and conditioning device, and the wire extends straight and continuously through the inspection device, wherein the wire is further coiled at the re-coiler, and wherein the wire extends continuously from the storage device to the re-coiler.

11. A system for inspecting coiled wire, the system comprising:
    a wire drawer configured to draw wire from a coiled wire storage device;
    a first power feeder having a two-plane straightening device, the first power feeder disposed downstream from the wire drawer, wherein the first power feeder is configured to straighten wire received from the wire drawer;

an ultrasonic inspection device disposed downstream from the first power feeder, the ultrasonic inspection device configured to receive straightened wire from the first power feeder and ultrasonically inspect the straightened wire for internal defects;

a re-coiler disposed downstream from the ultrasonic inspection device, the re-coiler configured to receive inspected wire and to re-coil the inspected wire for storage;

wherein the ultrasonic inspection device is disposed on a slide table moveable laterally relative to a feed direction of the wire such that the inspection device is moveable out of a feed path of the wire;

further comprising a test rod, wherein the test rod includes internal defects at predetermined locations, wherein the test rod is configured for insertion into the ultrasonic inspection device when the inspection device is out of the feed path of the wire.

12. The system of claim 11, wherein the test rod is mounted parallel to a feed direction of the wire and is linearly translatable parallel to the feed direction of the wire into the ultrasonic inspection device.

13. A method of ultrasonically inspecting a coiled wire, the method comprising:
unspooling wire from a coil of wire at a storage device and defining unspooled wire;
feeding the unspooled wire through a wire shaping and conditioning device and defining conditioned wire;
feeding the conditioned wire through a first power feeder, wherein the first power feeder includes driven feed rolls that actively pushes and/or pulls the wire therethrough and drives the wire through the system;
straightening the conditioned wire via the first power feeder and defining straightened wire;
feeding the straightened wire through an ultrasonic inspection device;
performing ultrasonic inspection of an interior of the straightened wire to detect internal defects of the straightened wire via rotation of transducers around the wire as the wire is being fed;
feeding the straightened wire through a second power feeder disposed downstream from the ultrasonic inspection device, wherein the second power feeder includes driven feed rolls that actively pushes and/or pulls the wire therethrough and drives the wire through the system;
after performing ultrasonic inspection of the straightened wire, re-coiling the straightened wire via a re-coiler.

14. The method of claim 13, wherein the second power feeder is offset from the first power feeder, further comprising creating tension in the wire between the first and the second power feeder.

15. The method of claim 13, wherein the ultrasonic inspection device is a first ultrasonic inspection device, further comprising detecting an internal defect via the first ultrasonic inspection device and recording the location of the internal defect, feeding the wire into a second ultrasonic inspection device and testing for the internal defect via the second ultrasonic inspection device to confirm the defect or to define a false positive if the defect is not confirmed.

16. The method of claim 15, wherein, in response to confirming the defect, stopping the feed of the wire and removing a segment of the wire having the defect.

17. The method of claim 15, wherein, in response to defining a false positive, continuing to feed the wire through the first and second ultrasonic inspection devices.

18. The method of claim 13, wherein the wire extends continuously from the storage device, through the inspection device, and onto the re-coiler, wherein the wire at the storage device is raw wire.

19. The method of claim 13 further comprising performing ultrasonic inspection and detecting internal defects on straightened wire without cutting off straight portions of the wire prior to inspection.

20. A method for inspecting wire, the method comprising:
unspooling a continuous length of wire from a first coil of wire, wherein the first coil of wire is a coil of raw wire;
after unspooling the wire, advancing the raw wire through a wire shaping and conditioning device that conditions the wire to a tighter tolerance relative to the raw wire, and conditioning the wire in the wire shaping and conditioning device, wherein the wire is conditioned to a tighter tolerance relative to the raw wire, wherein the wire shaping and conditioning device converts the raw wire to conditioned wire, wherein the conditioned wire has a tighter tolerance relative to the raw wire;
after conditioning the conditioned wire by the wire shaping and conditioning device, advancing the conditioned wire through a power feeder, and feeding the conditioned wire through the power feeder and straightening the conditioned wire at the power feeder, wherein the power feeder includes driven feed rolls that actively pushes and/or pulls the conditioned wire therethrough and drives the conditioned wire through the system;
wherein the wire shaping and conditioning device that provides the conditioned wire to the power feeder is disposed upstream of the power feeder, and the power feeder is disposed downstream of the wire shaping and conditioning device;
after feeding the conditioned wire via the power feeder and straightening the conditioned wire, performing ultrasonic inspection on the straightened and conditioned wire at an ultrasonic inspection device, which is positioned downstream from the power feeder, of a lengthwise portion of the conditioned wire and inspecting the interior of the lengthwise portion for internal defects, wherein the lengthwise portion of the conditioned wire remains part of a continuous length of wire;
re-coiling the continuous length of the conditioned wire after inspection at the ultrasonic inspection device and defining a second coil of wire, wherein the second coil of wire is a coil of conditioned and ultrasonically inspected wire.

* * * * *